United States Patent [19]

Shiba et al.

[11] 4,212,437
[45] Jul. 15, 1980

[54] TAPE CASSETTE

[75] Inventors: Haruo Shiba; Masatoshi Okamura, both of Tokyo, Japan

[73] Assignee: TDK Electronics Co. Ltd., Tokyo, Japan

[21] Appl. No.: 933,581

[22] Filed: Aug. 14, 1978

[30] Foreign Application Priority Data

Dec. 12, 1977 [JP] Japan .......................... 52-166794[U]

[51] Int. Cl.² ............................................... G03B 1/04
[52] U.S. Cl. ................................................... 242/199
[58] Field of Search ............................... 242/197–200; 360/96, 132; 150/3, 10

[56] References Cited

U.S. PATENT DOCUMENTS

| | | | |
|---|---|---|---|
| 3,065,922 | 11/1962 | Ballauf | 242/199 |
| 3,710,039 | 1/1973 | McFadden | 360/132 |

*Primary Examiner*—Leonard D. Christian
*Attorney, Agent, or Firm*—Oblon, Fisher, Spivak, McClelland & Maier

[57] ABSTRACT

A tape cassette including an upper half-case and a lower half-case and a tape guide wherein the tape guide is held only on one half-case and the upper and lower half-cases are fixed by screws only from one side of the half-cases through communicating holes except for a hole for the tape guide and wherein one end of a plate spring mounted on the one half-case and the other end or middle part of the plate spring is press-contacted with a lock plate to form a cover locking mechanism.

6 Claims, 7 Drawing Figures

TAPE CASSETTE

BACKGROUND OF THE INVENTION

1. Field of the Invention

The present invention relates to a tape guide which can be easily assembled from only one side.

2. Description of the Prior Art

Video tape cassettes have been used as well as audio tape cassettes.

Referring to FIG. 1, the assembly of the conventional video tape cassette will be illustrated.

FIG. 1 is a partially assembled schematic view of one embodiment of the conventional video tape cassette.

An upper half-case (1) and lower half-case (2) are assembled by screwing with screws (3a), (3b) and (3c) from the lower half-case (2) and screwing with screws (4a) and (4b) from the upper half-case (1).

In FIG. 1, a tape and a reel are not shown.

The screws (4a), (4b) inserted from the upper half-case (1) are screwed in the corresponding tape guides (5a), (5b) of the lower half-case (2). A metal guide ring (not shown) is inserted in each of the tape guides (5a), (5b). A lock plate (6) for fixing a cover for opening and closing (not shown) is provided and a coil spring (7) is inserted in the shaft (6a) of the lock plate (6). One edge (7a) of the coil spring (7) is contacted with the side (6b) of the lock plate (6) whereas the other edge (7b) of the spring is contacted with the edge member (2a) of the lower half-case (2).

In such conventional tape cassette, the screws are inserted from both of the upper half-case (1) and the lower half-case (2) whereby the efficiency in the assembling operation is remarkably inferior, disadvantageously.

FIG. 2 is a partially assembled schematic view of the tape cassette which is improved over the embodiment of FIG. 1. All of the screws (3a) . . . (3e) are inserted from the lower half-case in the assembly.

The screws (3c), (3e) are respectively inserted through the corresponding tape guides (5'a), (5'b) and are screwed on the corresponding tape guides (5"a), (5"b) of the upper half-case (1). The tape guides (5'a), (5"a) are combined and the tape guides (5'b), (5"b) are combined to form complete tape guides.

Metal guide rings (not shown) are inserted in the corresponding tape guides (5'a), (5'b) of the lower half-case (2) before assembling the upper and lower half-cases.

In this structure, the tape guides are formed on both of the half-cases to combine them into one tape guide in the assembly of the half-cases. Accordingly, it is not easy to give a satisfactory accuracy in the assembly.

If the accuracy is not complete, it is impossible to assemble the upper and lower half-cases because the guide rings are inserted in the tape guides.

SUMMARY OF THE INVENTION

It is an object of the present invention to provide a tape cassette which can be easily assembled from only one side.

It is another object of the present invention to provide a tape cassette which can be easily assembled without loss of accuracy.

The foregoing and other objects of the present invention have been attained by providing a tape cassette which comprises an upper half-case, a lower half-case wherein a tape guide is held only on one half-case and the upper and lower half-cases are fixed by screwing with screws only from one side of the half-cases through communicating holes except the tape guide.

DETAILED DESCRIPTION OF THE PREFERRED EMBODIMENTS

Figure 1:
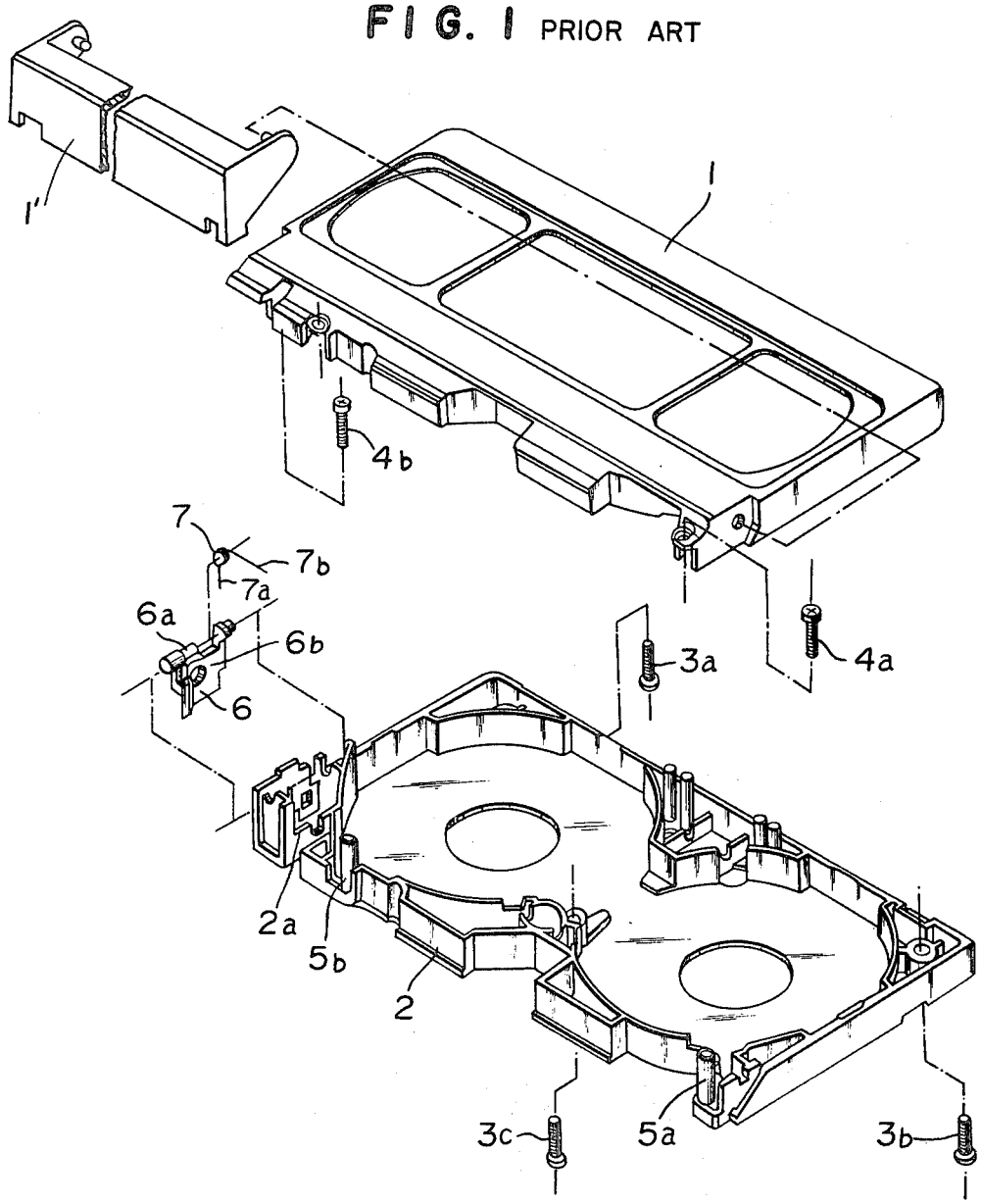
FIG. 1 is a partially assembled schematic view of the conventional tape cassette.
Figure 2:
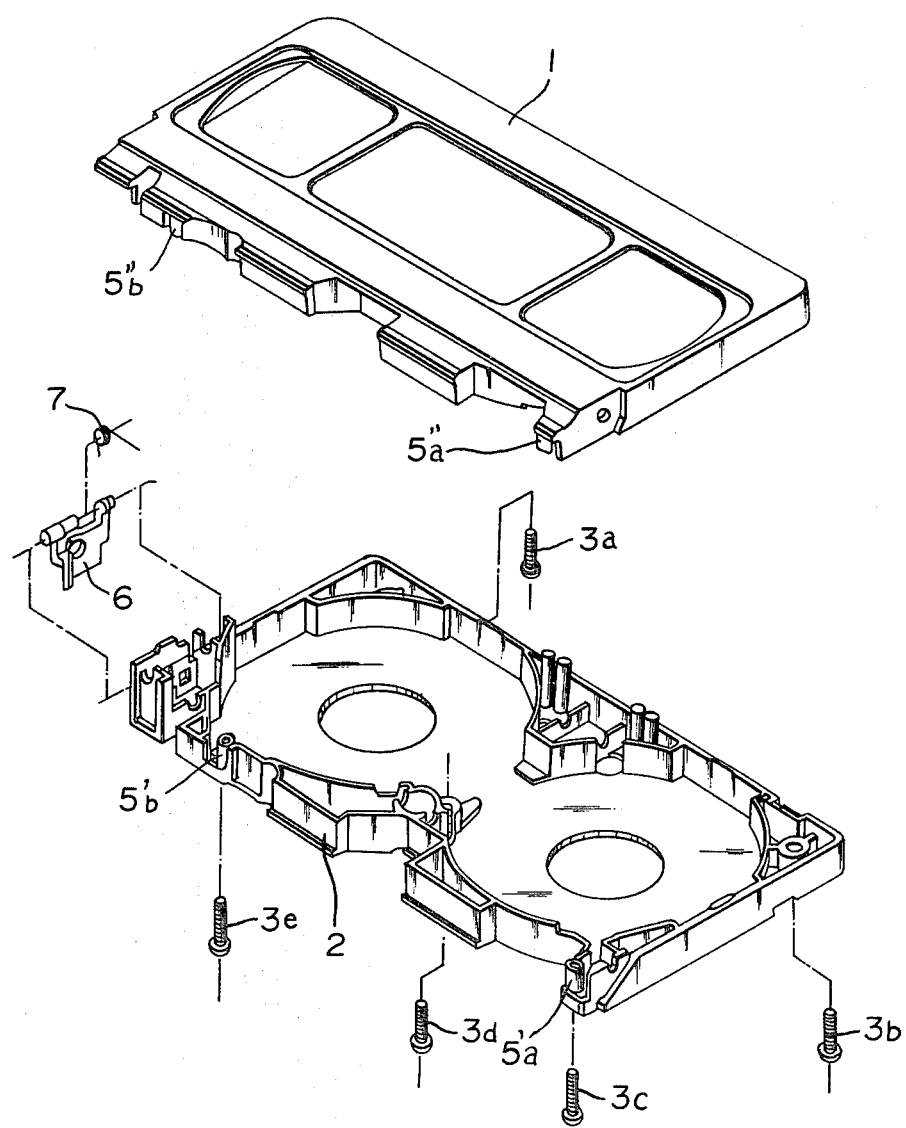
FIG. 2 is a partially assembled schematic view of the other embodiment of the conventional tape cassette.
Figure 3:
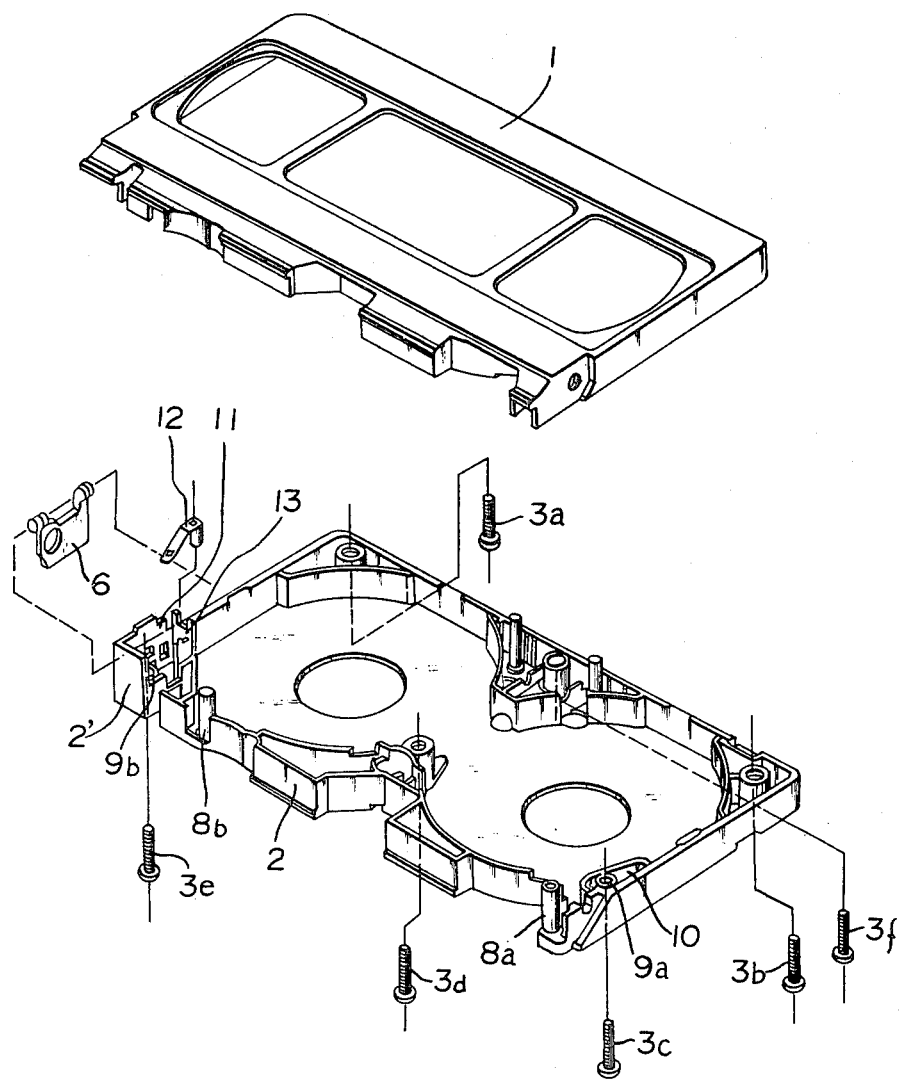
FIG. 3 is a partially assembled schematic view of one embodiment of the present invention.
Figure 4:
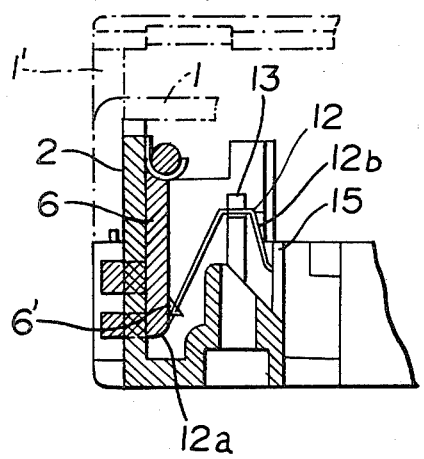
FIG. 4 is a partially enlarged sectional view of FIG. 3.
Figure 5:
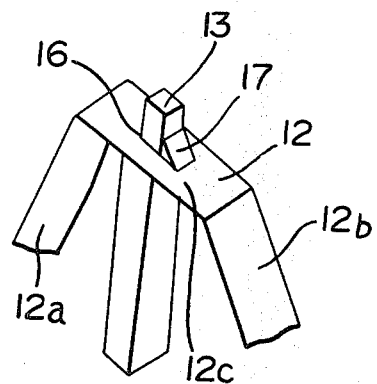
FIG. 5 is a partially enlarged view of a part of FIG. 4.

As shown in FIG. 3, in the tape cassette of the present invention, all of the screws (3a to 3f) are inserted from the lower half-case (2). The screws (3c), (3e) are not inserted into the tape guides but are inserted into the other screw holders (9a), (9b) for screwing them. The tape guides (8a), (8b) are mounted only on the lower half-case (2) whereby there is not any trouble for inserting the guide rings. The screw holder (9a) is diposed at the space (10) at the right front edge of the lower half-case (2). The screw holder (9b) is disposed adjacent to a cover locking mechanism (11). The cover locking mechanism (11) is different from that of the conventional tape cassette and it is made of a plate spring (12). Since the plate spring (12) is used for the cover locking mechanism, whereby it is possible to dispose the plate spring (12) spaced from the left front surface (2') of the lower half-case. Accordingly, a space can be provided, near the left front surface (2') and the screw holder (9b) can be disposed within the space.

The cover locking mechanism using a plate spring will be further illustrated.

Figure 6A:
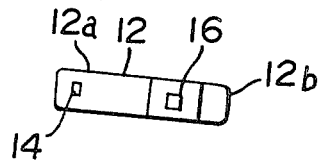
FIG. 6 (a), (b) are respectively a plan view and a front view of a plate spring.
Figure 6B:
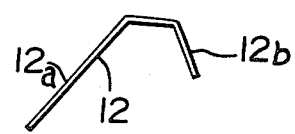

In FIG. 6, the plate spring (12) is used and one end (12a) of the plate spring (12) is press-contacted with a lock plate (6) of a cover 1'. A projection (6') of the lock plate (6) is inserted into the hole (14) formed on one end (12a) of the spring to complete the press-contact. The other end (12b) of the spring is press-contacted with a side wall (15) of a half-case (2). A square hole (16) is formed at the central part of the plate spring (12) and a square rib (13) mounted on the half-case (2) is inserted into the square hole (16) to fix the plate spring (12). Bent hooks (17) are formed adjacent to the square hole (16) and the rib (13) is held by the bent hooks (17) to complete the fixing between the rib (13) and the plate spring (12). The rib (13) can be a round rod instead of the spuare rod and the round hole (16) can be formed instead of the square hole and both of them be fixed by other means such as screws. However, fixing thereof can be simple when the square rib and the square hole are formed.

When the rib (13) is firmly fixed to the plate spring (12), it is not necessary to form the end (12b) of the plate spring (12) for press contacting with the side wall (15) of the half-case (2).

In accordance with the tape cassette of the present invention, all of the screws are inserted only from one side of the half-case whereby the assembling operation is quite easy. Moreover, the screw is not inserted into the tape guide whereby high accuracy for adjusting the tape guides is not required to be economical.

What is claimed as new and desired to be secured by Letters Patent of the United States is:

1. A tape cassette cover locking mechanism for a tape cassette having a first and second half-case comprising:
   a cover lockably mounted on said first half-case;
   a lock plate mounted on said second half-case for engaging said cover;
   a rib member mounted on said second half-case; and,
   a plate spring fixedly mounted on said rib, one end of which engages said lock plate.

2. A tape cassette cover locking mechanism as set forth in claim 1, said one end of said plate spring having a hole formed therein and a projection formed on said lock plate for engaging said hole in said plate spring.

3. A tape cassette cover locking mechanism as set forth in claim 1, further comprising:
   screw members passing through apertures formed in only one of said first and second half-cases and engaging corresponding apertures formed in the other of said first and second half-cases.

4. A tape cassette cover locking mechanism as set forth in claim 1, further comprising:
   means for securing said plate spring to said rib member.

5. A tape cassette cover locking mechanism as set forth in claim 3 or 4, said one end of said plate spring having a hole formed therein and a projection formed on said lock plate for engaging said hole in said plate spring.

6. A tape cassette cover locking mechanism as set forth in claim 1, further comprising:
   a side wall formed on said second half-case wherein an end portion of said one end of said spring plate engages said side wall.

* * * * *